(12) United States Patent
Nishiyama et al.

(10) Patent No.: US 10,364,849 B2
(45) Date of Patent: Jul. 30, 2019

(54) CONSTANT-VELOCITY JOINT

(71) Applicant: JTEKT CORPORATION, Osaka-shi (JP)

(72) Inventors: Yukinobu Nishiyama, Kariya (JP); Tetsuji Kawasumi, Takahama (JP); Satoshi Kato, Chiryu (JP); Keishi Kobata, Anjo (JP); Masahito Ikeo, Kariya (JP); Hideki Sugiura, Nagakute (JP)

(73) Assignee: JTEKT CORPORATION, Osaka-shi (JP)

( * ) Notice: Subject to any disclaimer, the term of this patent is extended or adjusted under 35 U.S.C. 154(b) by 261 days.

(21) Appl. No.: 15/585,232

(22) Filed: May 3, 2017

(65) Prior Publication Data

US 2017/0321759 A1   Nov. 9, 2017

(30) Foreign Application Priority Data

May 6, 2016   (JP) ................. 2016-093217

(51) Int. Cl.
 *F16D 3/2233* (2011.01)
 *F16D 3/2245* (2011.01)
 *F16D 3/223* (2011.01)

(52) U.S. Cl.
CPC ......... *F16D 3/2233* (2013.01); *F16D 3/2245* (2013.01); *F16D 2003/22309* (2013.01); *Y10S 464/906* (2013.01)

(58) Field of Classification Search
CPC ...... F16D 3/223; F16D 3/2233; F16D 3/2245; F16D 2003/22303; F16D 2003/22309; F16D 2003/22313; Y10S 464/906
USPC ......................................... 464/145, 146, 906
See application file for complete search history.

(56) References Cited

U.S. PATENT DOCUMENTS

2016/0356317 A1   12/2016   Kashiwagi et al.

FOREIGN PATENT DOCUMENTS

JP   2012-7741   1/2012

*Primary Examiner* — Josh Skroupa
(74) *Attorney, Agent, or Firm* — Oblon, McClelland, Maier & Neustadt, L.L.P.

(57) ABSTRACT

In a constant-velocity joint, a center locus of a ball rolling on a first outer large-diameter portion has an arc shape having an arc center, and a center locus of the ball rolling on a second outer large-diameter portion has an arc shape having an arc center. Center loci of the ball rolling on an outer extension portion are positioned, throughout their lengths, in a region inducing a tangent line to an opening-side end portion of the center locus of the ball rolling on the second outer large-diameter portion, the region being positioned outward of the tangent line in a radial direction of the outer joint member. An opening-side end portion of the center locus of the ball rolling on the outer extension portion is positioned outward of the tangent line in the radial direction of the outer joint member.

7 Claims, 7 Drawing Sheets

FIG.7B

CONSTANT-VELOCITY JOINT

INCORPORATION BY REFERENCE

The disclosure of Japanese Patent Application No. 2016-093217 filed on May 6, 2016 including the specification, drawings and abstract is incorporated herein by reference in its entirety.

BACKGROUND OF THE INVENTION

1. Field of the Invention

The invention relates to a constant-velocity joint.

2. Description of Related Art

There is a known constant-velocity joint including an outer joint member in the shape of a bottomed tube, an inner joint member disposed inside the outer joint member, a plurality of balls disposed between a plurality of outer ball grooves provided in the outer joint member and a plurality of inner ball grooves provided in the inner joint member, and a cage configured to hold the balls. The balls are rollably supported by the raceway surfaces of the outer ball grooves and the raceway surfaces of the inner ball grooves, and the balls transmit torque between the outer joint member and the inner joint member.

There is a known technique applied to a conventional constant velocity joint. According to this technique, a plurality of outer ball grooves has the same ball groove shape, a plurality of inner ball grooves has the same shape, and the ball groove centers of the outer ball grooves and the ball groove centers of the inner ball grooves are offset from each other in opposite directions with respect to the joint center. In such a constant-velocity joint, as a force that attempts to push the balls toward an opening of an outer joint member is applied, a cage that holds the balls attempts to move toward the opening of the outer joint member. At this time, friction is generated between the cage and both an inner peripheral surface of the outer joint member and an outer peripheral surface of an inner joint member, and thus a mechanical loss is caused when torque is transmitted between the outer joint member and the inner joint member.

In this regard, Japanese Patent Application Publication No. 2012-7741 (JP 2012-7741 A) describes constant-velocity joint in which the ball groove shapes of outer ball grooves alternate and the ball groove shapes of inner ball grooves alternate. The center locus of each ball rolling between a first outer ball groove and a first inner ball groove is set to an S-shape, the ball groove center of a second outer ball groove adjacent to the first outer ball groove in the circumferential direction is offset in an opposite direction with respect to the ball groove center of the first outer ball groove, and the ball groove center of a second inner ball groove adjacent to the first inner ball groove in the circumferential direction is offset in an opposite direction with respect to the ball groove center of the first inner ball groove.

In the constant-velocity joint described in JP 2012-7741 A, the balls disposed between the first outer ball grooves and the first inner ball grooves receive forces that attempt to move the balls in a direction toward the bottom of the outer joint member, whereas the balls disposed between the second outer ball grooves and the second inner ball grooves receive forces that attempt to move the balls in a direction toward the opening of the outer joint member, which is a direction opposite to the direction toward the bottom of the outer joint member. As a result, the forces applied to the balls are cancelled out each other, and thus friction generated between the cage and the inner peripheral surface of the outer joint member and friction generated between the cage and the outer peripheral surface of the inner joint member are suppressed.

However, in the constant-velocity joint described in JP 2012-7741 A, it is not possible to ensure a sufficient joint angle formed between the central axis of the outer joint member and the central axis of the inner joint member.

SUMMARY OF THE INVENTION

One object of the invention is to provide a constant-velocity joint configured such that the maximum value of a joint angle can be set to a large value.

A constant-velocity joint according to an aspect of the invention includes: an outer joint member in a shape of a bottomed tube that is open on one side in an axial direction, the outer joint member having first outer ball grooves and second outer ball grooves provided in an inner peripheral surface of the outer joint member; an inner joint member disposed inside the outer joint member, the inner joint member having first inner ball grooves and second inner ball grooves provided in an outer peripheral surface of the inner joint member; balls disposed between the first outer ball grooves and the first inner ball grooves and between the second outer had grooves and the second inner ball grooves; and a cage disposed between the inner peripheral surface of the outer joint member and the outer peripheral surface of the inner joint member, the cage having cage pockets configured to store the balls.

Each of the first inner bad grooves has a first inner large-diameter portion configured such that the ball rolls on the first inner large-diameter portion. Each of the second inner ball grooves has a second inner large-diameter portion and an inner extension portion. The second inner large-diameter portion is configured such that the ball rolls on the second inner large-diameter portion. The inner extension portion expends from the second inner large-diameter portion toward a bottom of the outer joint member. Each of the first outer ball grooves has a first outer large-diameter portion configured such that the ball is reliably supported between the first outer large-diameter portion and the first inner ball groove. Each of the second outer ball grooves has a second outer large-diameter portion and an outer extension portion. The second outer large-diameter portion is configured such that the ball is rollably supported between the second outer large-diameter portion and the second inner ball groove. The outer extension portion extends front the second outer large-diameter portion reward an opening of the outer joint member. The outer extension portion is configured such that the ball is supported so as to be reliable between the outer extension position and the inner extension portion. The outer extension portion constitutes a part of an opening-side end portion of the outer joint member.

A center locus of the ball rolling on the first outer large-diameter portion has an arc shape having an arc center at a position that is on the opposite side of a central axis of the outer joint member from the first outer large-diameter portion, and that is closer to the opening of the outer joint member than a joint center is. A center locus of the ball rolling on the second outer large-diameter portion has an arc shape having an arc center at a position that is on the opposite side of the central axis of the outer joint member from the second outer large-diameter portion, and that is closer to the bottom of the outer joint member than the joint center is.

A center locus of the ball rolling on the outer extension portion is positioned, throughout its length, in a region including a tangent line to an opening-side end portion of the center locus of the ball rolling on the second outer large-diameter portion, the opening-side end portion being on an opening side of the outer joint member, and the region being positioned outward of the tangent line in a radial direction of the outer joint member. An opening-side end portion of the center locus of the ball rolling on the outer extension portion, the opening-side end portion of the center locus being on the opening side of the outer joint member, is positioned outward of the tangent line in the radial direction of the outer joint member.

In the constant-velocity joint according to the above aspect, the balls disposed between the first outer ball grooves and the first inner ball grooves and the balls disposed between the second outer ball grooves and the second inner ball grooves receive, depending on changes in a joint angle that is an angle between the central axis of the outer joint member and a central axis of the inner joint member, forces that attempt to move the balls toward the opening of the outer joint member or toward the bottom of the outer joint member.

In view of this, in the constant-velocity joint according to the above aspect, the center locus of the ball rolling on the first outer large-diameter portion has an arc shape having the arc center at a position that is closer to the opening of the outer joint member than the joint center is, whereas the center locus of the ball rolling on the second outer large-diameter portion has an arc shape having the arc center at a position that closer to the bottom of the outer joint member than the joint center is. Thus, the balls rolling on the first outer large-diameter portions and the first inner large-diameter portions receive forces that attempt to move the balls in a direction toward the bottom of the outer joint members, whereas the balls rolling on the second outer large-diameter portions and the second inner large-diameter portions receive forces that attempt to move the balls in a direction toward the opening of the outer joint, which is a direction opposite to the direction toward the bottom of the outer joint member. Thus, the forces applied to the balls rolling on the first outer large-diameter portions and the first inner large-diameter portions and the forces applied to the balls rolling on the second outer large-diameter portions and the second inner large-diameter portions are cancelled out each other. Consequently, it is possible to suppress the displacement of the cage due to the rolling of the balls.

As a result, the friction generated between the cage and the inner peripheral surface of the outer joint member and the friction generated between the cage and the outer peripheral surface of the inner joint member can be reduced. Thus, it is possible to suppress a mechanical loss caused when torque is transmitted between the outer joint member and the inner member.

The second outer large-diameter portion is configured such that the center locus of the ball rolling on the second outer large-diameter portion has an arc shape having an arc center at a position that is closer to the bottom of the outer joint member than the joint center is. Further, the outer extension portion is configured such that the center locus of the ball rolling on the outer extension portion is positioned, throughout is length, in the region including the tangent line to the opening-side end portion of the center locus of the ball rolling on the second outer large-diameter portion, the region being positioned outward of the tangent line in the radial direction of the outer joint member. Further, the outer extension portion is configured such that the opening-side end portion of the center locus of the ball rolling on the outer extension portion is portioned outward of the tangent line in the radial direction of the outer joint member. As a result, the inner diameter of the outer joint member, at the opening-side end portion, can be set to a huge value, and thus the maximum value of the joint angle can be set to a large value.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, constant-velocity joints according to example embodiments of the invention will be described with reference to the accompanying drawings. First, a constant-velocity joint 100 according to a first embodiment of the invention will be described with reference to FIGS. 1A to 5. The constant-velocity joint 100 is a joint center-fixed ball-type constant-velocity joint (e.g., a Rzeppa constant-velocity joint). The constant-velocity joint 100 is preferably used as an outboard joint of a front drive shaft of an automobile.

Figure 1A:
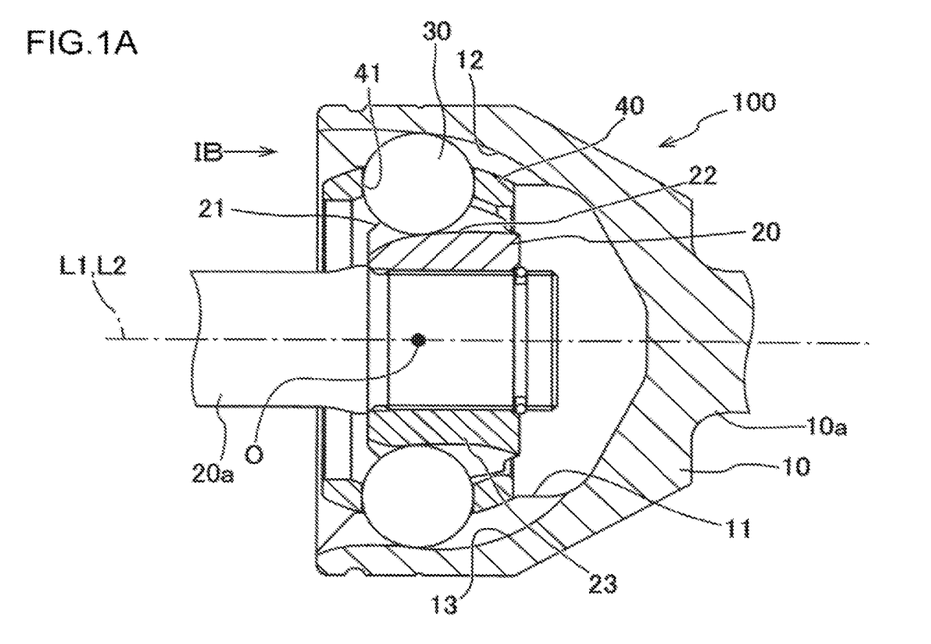
FIG. 1A is a sectional view of a constant-velocity joint according to a first embodiment of the invention, the sectional view taken along the axial direction of the constant-velocity joint.
Figure 1B:
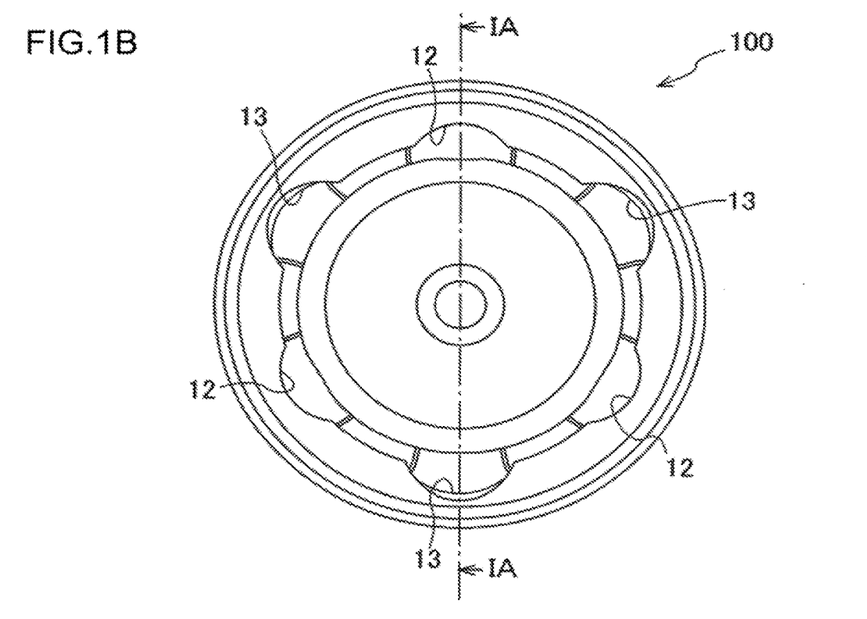
FIG. 1B is a view of the constant-velocity joint as viewed in a direction of an arrow 1B illustrated in FIG. 1A.

As illustrated in FIG. 1A and FIG. 1B, the constant-velocity joint 100 mainly includes an outer joint member 10, an inner joint member 20, balls 30, and a cage 40.

The outer joint member 10 is in the shape of a bottomed tube that is open on one side (i.e., the left side in FIG. 1) in the direction of a central axis L1 (hereinafter, referred to as "central axis L1-direction"). The outer joint member 10 has an inner peripheral surface 11 having a concave sphere shape, and has first outer ball grooves 12 and second outer bad grooves 13 that are provided in the inner peripheral surface 11. A connecting shaft 10a extending in the central axis L1-direction is provided at a bottom portion of the outer joint member 10 in an integrated manner. The connecting shaft 10a is connected to another power transmission shaft (not illustrated). The first outer ball grooves 12 and the second outer ball grooves 13 are grooves extending in the central as is L1-direction of the outer joint member 10. The outer joint member 10 has three first outer ball grooves 12 and three second outer ball grooves that are alternately provided in the circumferential direction of the outer joint member 10.

The inner joint member 20 has an annular shape. The inner joins member 20 has an outer peripheral surface 21 having a convex sphere shape, and has first inner ball grooves 22 and second inner ball grooves 23 that are provided in the outer peripheral surface 21 of the inner joint member 20. The first inner ball grooves 22 and the second inner ball grooves 23 are grooves extending in the direction of a central axis L2 of the inner joint member 20 (hereinafter, referred to as "central axis L2-direction"). The inner joint member 20 has three first inner ball grooves 22 and three second inner ball grooves 23 that are alternately provided in the circumferential direction of the inner joint member 20.

The balls 30 transmit torque between the outer joint member 10 and the inner joint member 20. When the inner joint member 20 is deposed inside the outer joint member 10, the first outer ball grooves 12 face the last inner ball grooves 22, the second outer ball grooves 13 face the second inner ball grooves 23, and the balls are rollably disposed between the first outer ball grooves 12 and the first inner ball grooves 22 and between the second outer ball grooves and the second inner ball grooves. The inner joint member 20 rotates about a joint center O relative to the outer joint member 10 while rolling the balls 30. That is, the inner joint member 20 is configured to form an angle (i.e., joint angle) with respect to the outer joint member 10.

The cage 40 disposed between the inner peripheral surface 11 of the outer joint member 10 and the outer peripheral surface 21 of the inner joint member 20. The cage has cage pockets 41 each of which is configured to store one ball 30. The cage 40 rotates about the joint center O as the balls 30 roll.

Next, the first inner ball grooves and the first outer ball grooves 12 will be described with reference to FIG. 2A and FIG. 2B.

Figure 2A:
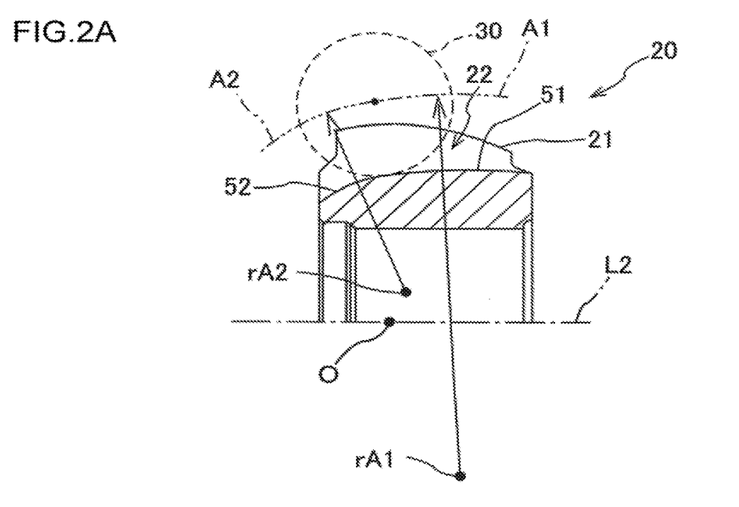
FIG. 2A is a sectional view of an inner joint member including first inner ball grooves the sectional view taken along the axial direction of the inner joint member, FIG. 2A being an enlarged view illustrating an upper portion of the inner joint member illustrated in FIG. 1A.

As illustrated in FIG. 2A, each first inner ball groove 22 is configured such that the ball 30 can roll thereon. The first inner ball groove 22 has a first inner large-diameter portion 51 and a first inner small-diameter portion 52. The first inner large-diameter portion 51 is a portion on which the ball 30 that rolls in the first inner ball groove 22 is disposed when the joint angle is a normal angle. A locus A1 of the center of the ball 30 (hereinafter, referred to as "center locus A1 of the ball 30") rolling on the first inner large-diameter portion 51 has an arc shape having an arc central rA1. The arc center rA1 is at a position that is on the opposite side of the central axis L2 of the inner joint member 20 from the first inner large-diameter portion 51 (i.e., below the central axis L2 in FIG. 2), and that is closer to the bottom of the outer joint member 10 than a joint center O is (i.e., on the right side of the joint center O in FIG. 2A).

The first inner small-diameter portion 52 is a portion extending from the first inner large-diameter portion 51 toward the opening of the outer joint member 10 (i.e., toward the left side in FIG. 2A). A locus A2 of the center of the ball 30 (hereinafter referred to as "center locus A2 of the ball 30") rolling on the first inner small-diameter portion 52 has an arc shape having an arc center rA2. The arc center rA2 is at a position that is closer to the first inner small-diameter portion 52 than the central axis L2 of the inner joint member 20 is (i.e., above the central axis L2 in FIG. 2A), and that is closer to the bottom of the outer joint member 10 than the joint center O is.

Figure 2B:
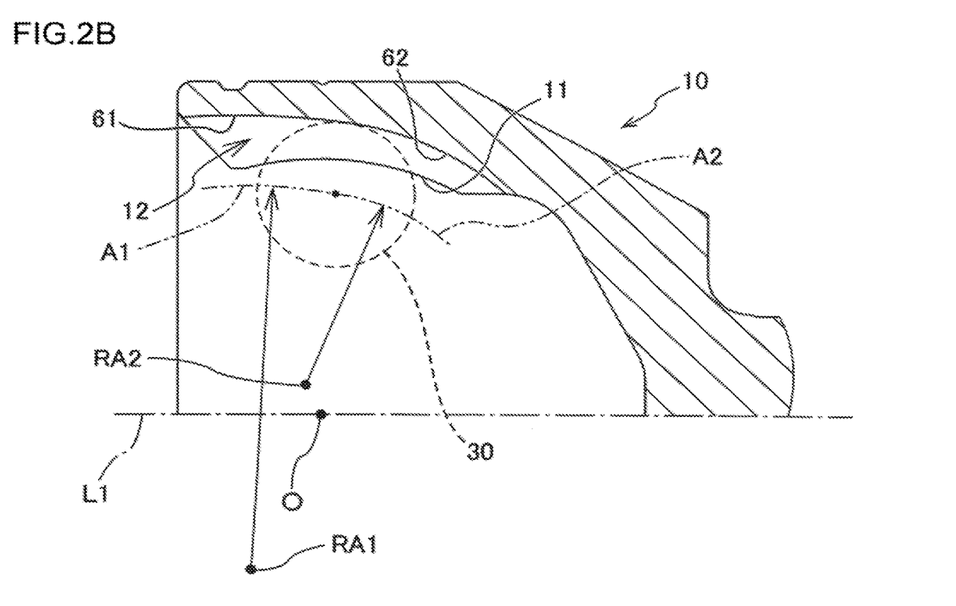
FIG. 2B is a sectional view of an outer joint member including first outer ball grooves the sectional view taken along the axial direction of the outer joint member, FIG. 2B being an enlarged view illustrating an upper portion of the outer joint member illustrated in FIG. 1A.

As illustrated in FIG. 2B, each first outer ball groove 12 is configured such that the ball 30 can roll thereon. The first outer ball groove 12 has a first outer large-diameter portion 61 and a first outer small-diameter portion 62. The first outer huge-diameter portion 61 is a portion on which the ball 30 that rolls in the first outer ball groove 12 is deposed when the joint angle is a normal angle. The ball 30 can be rollably supported between the first outer large-diameter portion 61 and the first inner large-diameter portion 51. The center locus A1 of the ball rolling on the first outer large-diameter portion 61 has an arc shape having an arc center RA1. The arc center RA1 is at a position that is on the opposite side of the central axis L1 of the outer joint member 10 from the first outer large-diameter portion 61 (i.e., below the central axis L1 in FIG. 2B), and that is closer to the opening of the outer joint member 10 than the joint center O is (i.e., on the left side of the joint center O in FIG. 2B).

The first outer small-diameter portion 62 is a portion extending from the first outer large-diameter portion 61 toward the bottom of the outer joint member 10 (i.e., toward the right side in FIG. 2B). The ball 30 can be rollably supported between the first outer small-diameter portion 62 and the first inner small-diameter portion 52. The center locus A2 of the ball 30 rolling on the first outer small-diameter portion 62 has an arc shape having an arc center RA2. The arc center RA2 is at a position that is closer to the first outer small-diameter portion 62 than the central axis L1 of the outer joint member 10 is (i.e., above the central axis L1 in FIG. 2B), and that is closer to the opening of the outer joint member 10 than the joint center O is.

Figure 3A:
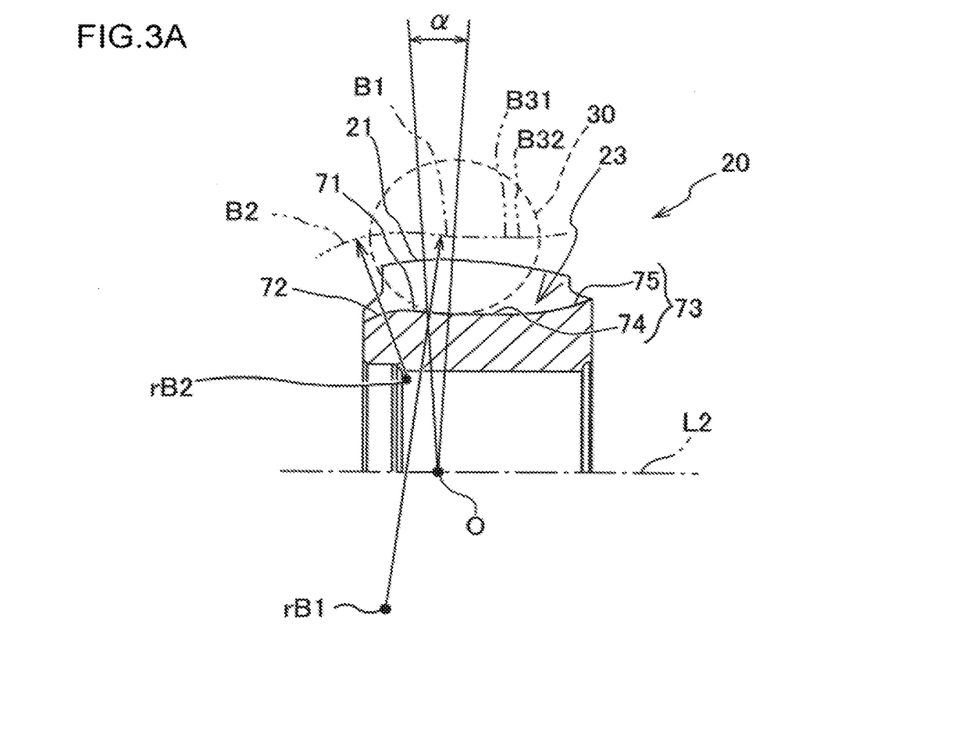
FIG. 3A is a sectional view of the inner joint member including second inner ball grooves, the sectional view taken along the axial direction of the inner joint member, FIG. 3A being an enlarged view illustrating a lower portion of the inner joint member illustrated in FIG. 1A.

Next, the shape of each second inner ball groove 23 will be described with reference to FIG. 3A and FIG. 3B. As illustrated in FIG. 3A, the second inner ball groove 23 is configured such that the ball 30 can roll thereon. The second inner ball groove 23 has a second inner large-diameter portion 71, a second inner small-diameter portion 72, and an inner extension portion 73. The second inner large-diameter portion 71 is a portion on which the ball 30 that rolls in the second inner ball groove 25 is disposed when the joint angle is a normal angle. A locus B1 of the center of the ball 30 (hereinafter, referred to as "center locus B1 of the ball 30") rolling on the second inner large-diameter portion 71 has an arc shape having an arc center rB1. The arc center rB1 is at a position that is closer to the opening of the outer joint member 10 than the joint center O is (i.e., on the left side of the joint center O in FIG. 3A), and the outer diameter of the second inner large-diameter portion 71 decreases toward the bottom of the outer joint member 10 (i.e., toward the right side in FIG. 3A) from the opening side of the outer joint member 10.

The second inner small-diameter portion 72 is a portion extending from the second inner large-diameter portion 71 toward the opening of the outer joint member 10 (i.e., toward the left side in FIG. 3A). A locus B2 of the center of the ball 30 (hereinafter, referred to as "center locus B2 of the ball 30") rolling on the second inner small-diameter portion 72 has an arc shape having an arc center rB2. The arc center rB2 is at a position that is closer to the second inner small-diameter portion 72 than the central axis L1 of the outer joint member 10 is, and that is closer to the opening of the outer joint member 10 than the joint center O is.

Figure 3B:
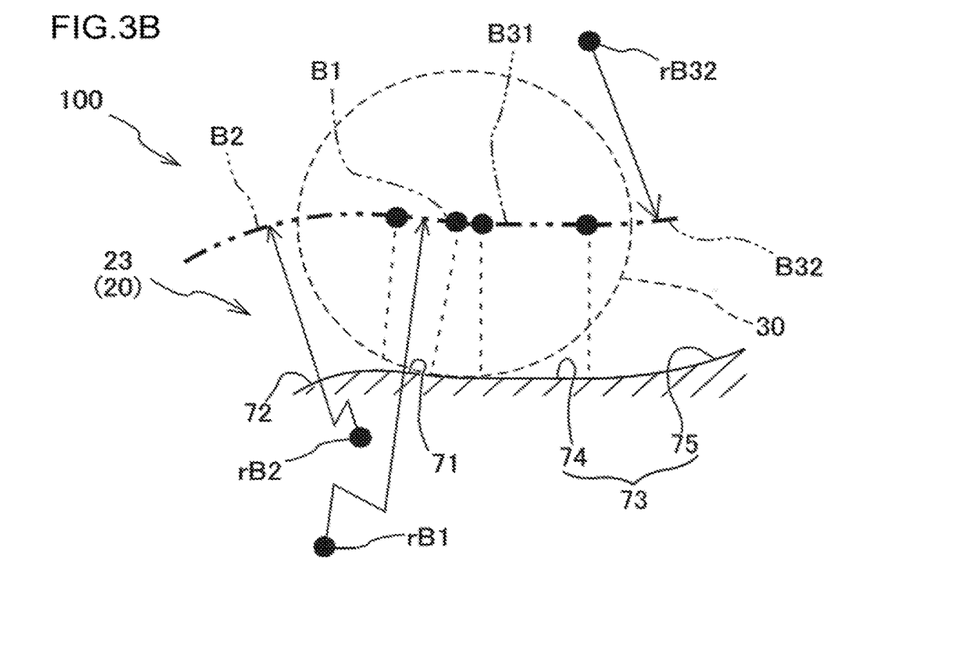
FIG. 3B is a view schematically illustrating a center locus of a ball rolling on a raceway surface of the second inner ball groove.

As illustrated in FIG. 3B, the inner extension portion 73 is a portion extending from the second sorter large-diameter portion 71 toward the bottom of the outer joint member 10 (i.e., toward the right side in FIG. 3B), and the inner extension portion 73 has an inner uniform-diameter portion 74 and an inner diameter-increasing portion 75. The inner uniform-diameter portion 74 is a portion extending from the second inner large-diameter portion 71 toward the bottom of the outer joint member 10, and a raceway surface of the inner uniform-diameter portion 74 on which the ball 30 rolls extends parallel to the central axis L2-direction of the inner pint member 20. A locus B31 of the center of the ball 30 (hereinafter, referred to as "center locus B31 of the ball 30") rolling on the inner uniform-diameter portion 74 is linear and parallel to the central axis L2 of the inner joint member 20.

A junction between a raceway surface of the second inner large-diameter portion 71 and the raceway surface of the inner uniform-diameter portion 74 is in the shape of a curved surface that is concave inwardly in the radial direction of the inner joint member 20. Thus, it is possible to smoothly roll the ball 30 that moves between the second inner large-diameter portion 71 and the inner uniform-diameter portion 74.

The inner diameter-increasing portion 75 a portion extending from the inner uniform-diameter portion 74 toward the bottom of the outer joint member 10. A raceway surface of the inner diameter-increasing portion 75 on which the ball 30 rolls is in the shape of a curved surface having an outer diameter that increases toward the bottom of the outer joint member 10. A locus B32 of the center of the ball 30 (hereinafter, referred to as "center locus B32 of the ball 30") rolling on the inner diameter-increasing portion 75 has an arc shape having an arc center rB32. The arc center rB32 is at a position outward of the center of the ball 30 rolling on the inner diameter-increasing portion 75, in the radial direction of the inner joint member 20.

Figure 4A:
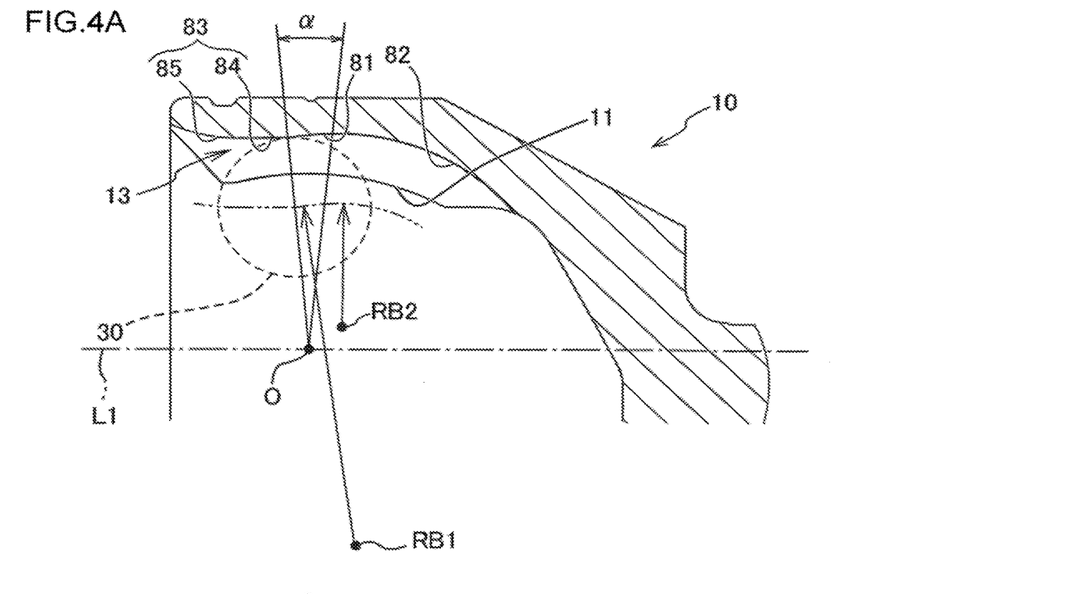
FIG. 4A is a sectional view of the outer joint member including second outer ball grooves, the sectional view taken along the axial direction of the outer joint member, FIG. 4A being an enlarged view illustrating a lower portion of the outer joint member illustrated in FIG. 1A.

Next, the shape of each second outer ball groove 13 will be described with reference to FIG. 4A to FIG. 5. As illustrated in FIG. 4A, the second outer ball groove 12 is configured such that the ball 30 can roll thereon. The second outer ball groove 13 has a second outer large-diameter portion 81, a second outer small-diameter portion 82, and an outer extension portion 83.

The second outer large-diameter portion 81 is a portion on which the ball 30 rods in the second outer ball groove 13 is disposed when the joint angle is a normal angle. The ball 30 is reliably supported between the second outer large-diameter portion 81 and the second inner large-diameter portion 71. The center locus B1 of the ball 30 rolling on the second outer large-diameter portion 81 has an are shape having an arc center RB1. The arc center RB1 is at a position closer to the bottom of the outer joint member 10 than the joint center O is (i.e., on the right side of the joint center O in FIG. 4A), and the inner diameter of the second outer large-diameter portion decreases toward the opening of the outer joint member 10 from the bottom side of the outer joint member 10.

A raceway surface of the second outer ball groove 15 on which the ball 30 rolls has a shape obtained by inverting a race was surface of the second inner ball groove 23 in the axial direction (i.e., in the lateral direction in FIG. 3A), and the center locus B1 of the ball 30 rolling on the second outer large-diameter portion 81 has a shape obtained by inverting the center locus B1 of the ball 30 rolling on the second inner large-diameter portion 71 in the axial direction.

In the constant-velocity joint 100, the balls 30 disposed between the first outer ball grooves 12 and the first inner ball grooves 22 (refer to FIG. 1A) and the balls 30 disposed between the second outer ball grooves 13 and the second inner ball grooves 23 (refer to FIG. 1A) receive, depending on changes in the joint angle, forces that attempt to move the balls 30 toward the opening (i.e., toward the left side in FIG. 4A) or toward the bottom of the outer joint member 10.

In view of this, in the constant-velocity joint 100, the center locus A1 of the ball 30 rolling on the first outer large-diameter portion 61 (refer to FIG. 2A) has an arc shape having the arc center RA1 that is at a position closet to the opening of the outer joint member 10 than the joint center O whereas the center locus B1 of the ball 30 rolling on the second outer large-diameter portion 81 has an arc shape having the arc center RB1 that is at a position closer to the bottom of the outer joint member to than the joint center O is.

Thus, the balls 30 rolling between the first outer large-diameter portions 61 and the first inner large-diameter portions 51 receive forces that attempt to move the balls 30 in a direction toward the bottom of the outer joint members 10, whereas the balls 30 rolling between the second outer large-diameter portions 81 and the second inner large-diameter portions 71 receive forces that attempt to move the balls 30 in a direction toward the opening of the outer joint members 10, which is a direction opposite to the direction toward the bottom of the outer joint member 10. Thus, the forces applied to the balls 30 rolling between the first outer large-diameter portions 61 and the first inner large-diameter portions 51 and the forces applied to the balls 30 rolling between the second outer large-diameter portions 81 and the second inner large-diameter portions 71 are cancelled out each other. Consequently, it is possible to suppress the displacement of the cage 40 due to the rolling of the balls 30.

As a result, the friction generated between the cage 40 and the inner peripheral surface 11 of the outer joint member 10 and the friction generated between the cage 40 and the outer peripheral surface 21 (refer to FIG. 3A) of the inner joint member 20 can be reduced. Thus, it is possible to suppress a mechanical loss caused when torque is transmitted between the outer joint member 10 and the inner joint member 20.

The second outer small-diameter portion 82 is a portion extending from the second outer large-diameter portion 81 toward the bottom of the outer joint member 10. The ball 30 is rollably supported between the second inner small-diameter portion 72 and the second outer small-diameter portion 82. The center locus B2 of the ball 30 rolling on the second outer small-diameter portion 82 has an arc shape having an arc center RB2. The arc center RB2 is at a position that is closer to the second outer small-diameter portion 82 than the central axis L1 of the outer joint member 10 is, and that is closer to the bottom of the outer joint member 10 than the joint center O is.

The first outer large-diameter portion 61 (refer to FIG. 2B) and the second outer large-diameter portion 81 respectively have the arc center RA1 and the arc center RB1 at positions that are farther away from the first outer large-diameter portion 61 and the second outer large-diameter portion 81 than the central axis L1 of the outer joint member 10 is. In this case, the arc radii of the first outer large-diameter portion 61 and the second outer large-diameter portion 81 can be set to larger values than those in a case where the arc centers RA1, RB1 are set at positions on the central axis L1 of the outer joint member 10 or at positions closer to the first outer large-diameter portion 61 and the second outer large-diameter portion 81 than the central axis L1 is. As a result, the inner diameter of the inner peripheral surface 11 of the outer joint member 10 can be set to a large value.

The first outer small-diameter portion 62 (refer to FIG. 2B) and the second outer small-diameter portion 82 respectively have the arc center RA2 and the arc center RB2 at positions closer to the first outer small-diameter portion 62 and the second outer small-diameter portion 82 than the central axis L1 of the outer joint member 10 is. Thus, the arc radii of the first outer small-diameter portion 62 and the second outer small-diameter portion 82 can be set smaller than the arc radii of the first outer large-diameter portion 61 and the second outer large-diameter portion 81. Thus, the axial length of the outer joint member 10 can be made shorter than that in a case where the arc radii of the first outer small-diameter portion 62 and the second outer small-diameter portion 82 are respectively equal to the arc radii of the first outer large-diameter portion 61 and the second outer large-diameter portion 81. As a result, it is possible to reduce the size of the constant-velocity joint 100.

Figure 4B:
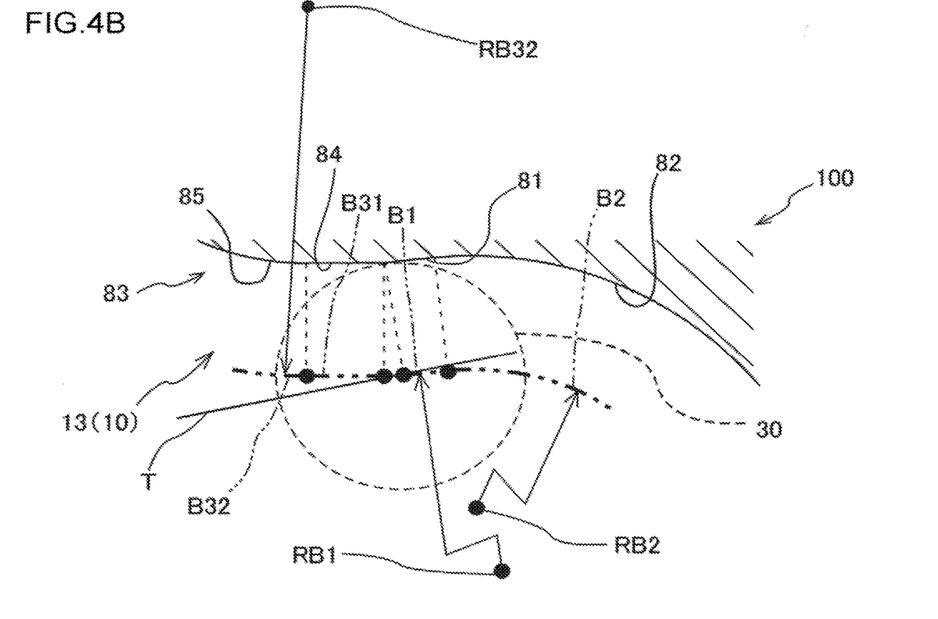
FIG. 4B is a view schematically illustrating a center locus of a ball rolling on a raceway surface of the second outer ball groove.

As illustrated in FIG. 4B, the outer extension portion 83 is a portion extending from the second outer large-diameter portion 81 toward the opening of the outer joint member 10 (i.e., toward the left side in FIG. 4A), and constitutes a part of an end portion on the opening side of the outer joint member 10. The ball 30 is rollably supported between the outer extension portion 83 and the inner extension portion 73. The outer extension portion 83 has an outer uniform-diameter portion 84 and an outer diameter-increasing portion 85.

The outer uniform-diameter portion 84 is a portion extending from the second outer large-diameter portion 81 toward the opening of the outer joint member 10. A raceway surface of the outer uniform-diameter portion 84 on which the ball 30 disposed on the outer uniform-diameter portion 84 rolls extends parallel to the central axis L1 (refer to FIG. 4A) of the outer joint member 10. The center locus B31 of the ball 30 rolling on the outer uniform-diameter portion 84 is linear and parallel to the central axis L1 of the outer joint member 10.

In this case, at a portion where the outer uniform-diameter portion 84 is provided, the distance from the raceway surface of the outer uniform-diameter portion 84 on which the ball 30 rolls to the central axis L1 of the outer joint member 10 can be set to a large value. As a result the inner diameter of the inner peripheral surface 11 of the outer joint member 10 can be set to a large value, and the maximum value of the joint angle can be set to a large value.

A junction between a raceway surface of the second outer large-diameter portion 81 and the raceway surface of the outer uniform-diameter portion 84 is in the shape of a curved surface that is convex inwardly in the radial direction of the outer joint member 10. Thus, it is possible to smoothly roll the ball 30 that moves between the second outer large-diameter portion 81 and the outer uniform-diameter portion 84.

The outer diameter-increasing portion 85 is a portion extending from the outer uniform-diameter portion 84 toward the opening of the outer joint member 10. A raceway surface of the outer diameter-increasing portion 85 on which the ball 30 rolls is in the shape of a curved surface having an inner diameter that increases toward the opening of the outer joint member 10. The center locus B32 of the ball 30 rolling on the inner diameter-increasing portion 75 and the outer diameter-increasing portion 85 has an arc shape having an arc center RB32 that is at a position outward of the censer of the ball 30 rolling on the onset diameter-increasing portion 85, in the radial direction of the outer joint member 10.

In this case, the distance from the center of the ball 30 disposed at an end portion of the outer diameter-increasing portion 85 on the opening side of the outer joint member 10 to the central axis L1 of the outer joint member 10 can be set to a large value. As a result, the inner diameter of the end portion of the outer diameter-increasing portion 85 on the opening side of the outer joint member 10 can be set to a huge value. Thus, in the course of manufacturing the constant-velocity joint 100, it is possible to more easily prevent the cage 40 from coming into contact with the opening-side end portion of the outer joint member 10 when the cage 40 is assembled to the inside of the outer joint member 10.

The distance front the center of the ball 30 disposed at the end portion of the outer extension portion 83 on the opening side of the outer joint member 10 (the end portion of the outer diameter-increasing portion 85) to the central as is L1 of the outer joint member 10 is longer than the distance from the center of the ball 30 disposed at the end portion of the outer extension portion 83 on the bottom side of the outer joint member 10 (the junction between the outer uniform-diameter portion 84 and the second outer large-diameter portion 81) to the central axis L1 of the outer joint member 10.

Thus, in the course of manufacturing the constant-velocity joint 100, it is possible to more easily prevent the cage 40 from coming into contact with the opening-side end portion of the outer joint member 10 when the cage 40 is assembled to the inside of the outer joint member 10. As a result, it is possible to efficiently perform a work of assembling the constant-velocity joint 100.

As described above, in the present embodiment, the outer extension portion 83 is configured such that the distance from the center of the ball 30 disposed at the end portion of the outer extension portion 83 on the opening side of the outer joint member 10 to the central axis L1 of the outer joint member 10 is longer than the distance from the center of the ball 30 disposed at the end portion of the outer extension portion 83 on the bottom side of the outer joint member 10 to the central axis L1 of the outer joint member 10. However, the shape of the outer extension portion 83 in the invention is not limited to this shape, and any shapes may be employed as long as the shape of the outer extension portion 83 in the invention satisfies at least the following requirements.

The outer extension portion 83 is configured such that the center loci B31, B32 of the ball 30 rolling on the outer extension portion 83 (the outer uniform-diameter portion 84 and the outer diameter-increasing portion 85) are positioned, throughout their lengths, in a region including a tangent line T to the end portion of the center locus B1 of the ball 30 rolling on the second outer large-diameter portion 81, the end portion being on the opening side of the outer joint member 10, and the region being outward of the tangent line T in the radial direction of the outer joint member 10. The end portion of the center loci B31, B32 of the ball 30 rolling on the outer extension portion 83, the end portion being on the opening side of the outer joint member 10, is positioned outward of the tangent line T in the radial direction of the outer joint member 10. Thus, it is possible to increase the inner diameter of the outer joint member 10, at the outer extension portion 83.

Figure 5:
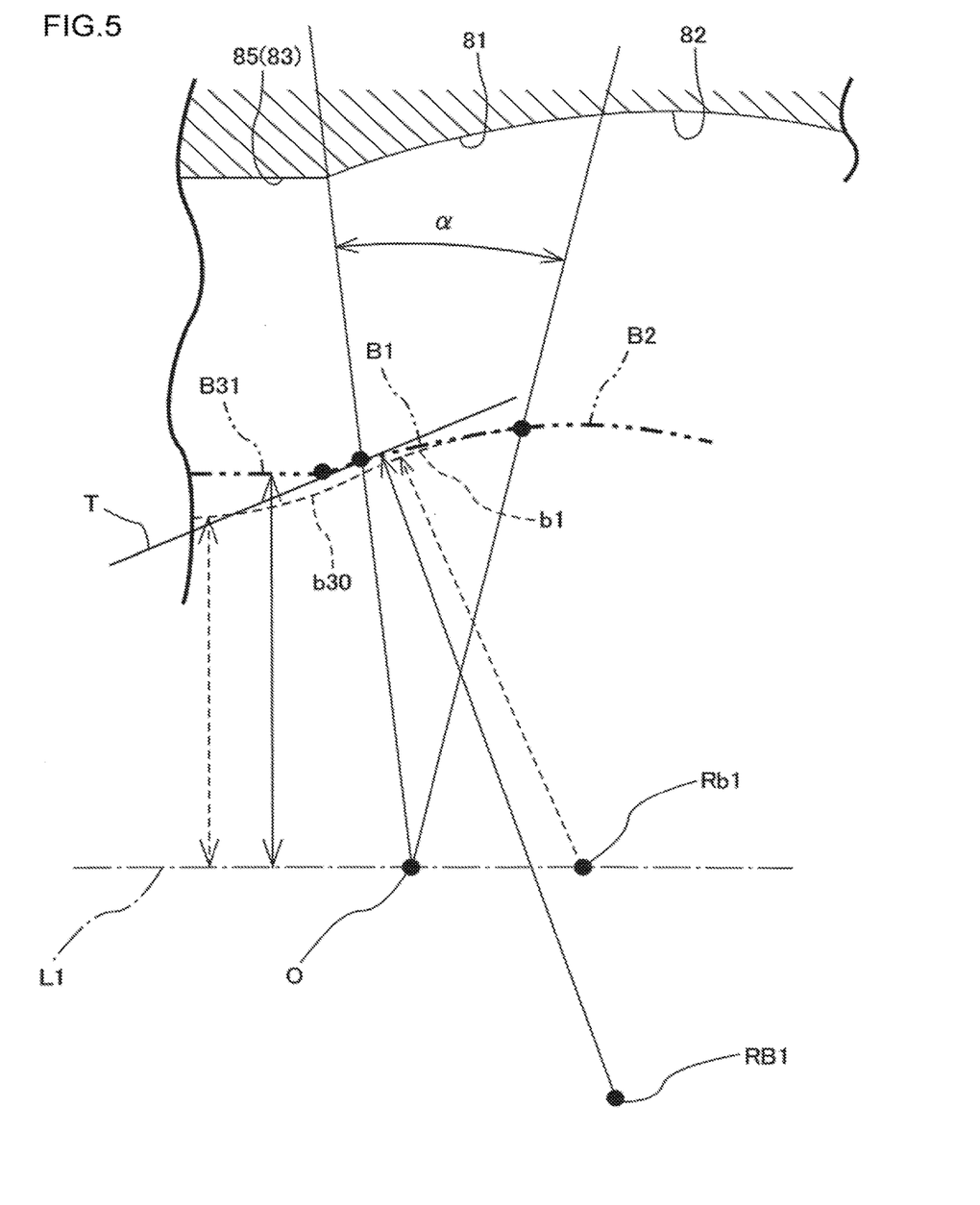
FIG. 5 is a partial enlarged sectional view of the second outer ball groove.

As illustrated in FIG. 5, the second outer large-diameter portion is a portion on which the ball 30 rolls when the joint angle is a normal angle. In a range of an angle α in which the ball 30 rolls around the joint center O when the joint angle is a normal angle, the center locus B1 of the ball 30 has an arc shape having the arc center RB1 at a position farther away from the second outer large-diameter portion 81 than the central axis L1 of the outer joint member 10 is.

In contrast, as indicated in a dashed lines in FIG. 5, in a conventional constant-velocity joint, a center locus b1 of the ball 30 when the joint angle is a normal angle has an arc shape having an arc center Rb1 on the central axis L1 of the outer joint member 10. A center locus b30 of the ball 30 rolling on a portion, which is closer so the opening of the outer joint member 10 than the center locus b1 is, is positioned in a region inward (i.e., on the lower side in FIG. 5) of the tangent line T in the radial direction of the outer joint member 10.

As described above, in the invention, it is possible to set the arc radius of the second outer large-diameter portion 81 to a larger value and to set the radius of the outer joint member 10 at the outer extension portion 83 to a larger value than those in the related art. As a result, it is possible to set the inner diameter of the outer joint member 10 at the opening-side end portion to a larger value, and thus it is possible to set the maximum value of the joint angle to a larger value.

Since the distance from the raceway surface for the ball 30 disposed on the outer extension portion 83 to the joint center O can be set to be long, it is possible to decrease a surface pressure applied to the outer extension portion 83 from the ball 30.

Next, a second embodiment will be described with reference to FIGS. 6A and 6B. In the first embodiment, the center locus of the ball 30 rolling on the outer extension portion 83 includes the center locus B31 formed such that the distance from the central axis L1 of the outer joint member 10 to the center locus B31 is constant, and the center locus B32 formed such that the distance from the central axis L1 to the center locus B32 increases toward the opening of the outer joint member 10. In contrast, in the second embodiment a center locus B230 of the ball 30 rolling on an outer extension portion 283 has an arc shape having an arc center at a position radially outward of the center of the ball 30 rolling on the outer extension portion 283. The same components as those in the first embodiment will be denoted by the same reference numbers as those in the fast embodiment and will not be described again.

In a constant-velocity joint 200 according to the second embodiment, an outer joint member 210 has the same configuration as that of the outer joint member 10 in the first embodiment except second outer ball grooves 213, and an inner joint member 220 has the same configuration as that of the inner joint member 20 in the first embodiment except second inner ball grooves 223.

Figure 6A:
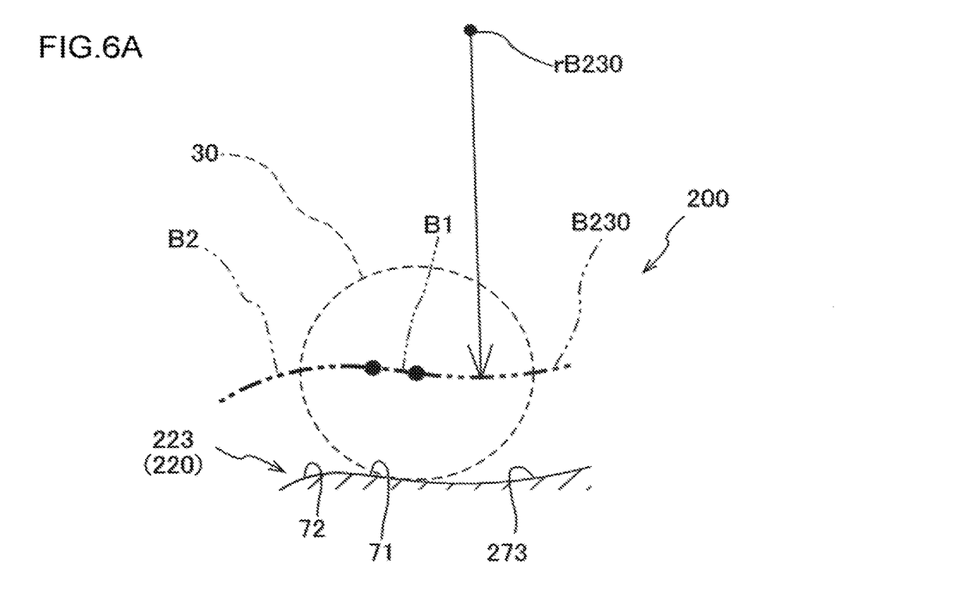
FIG. 6A is a view illustrating a second embodiment FIG. 6A being a view schematically illustrating a center locus of a ball rolling on a raceway surface of a second inner ball groove.

As illustrated in FIG. 6A, each second inner ball groove 223 has the second inner large-diameter portion 71, the second inner small-diameter portion 72, and an inner extension portion 273, and a raceway surface of the inner extension portion 273 on which the ball 30 rolls in the shape of a curved surface that is concave inwardly in the radial direction of the inner joint member 220. A center locus B230 of the ball 30 rolling on the inner extension portion 273 has an arc shape having an arc center rB230 at a position radially outward (i.e., on the upper side in FIG. 6A) of the center of the ball 30 rolling on the inner extension portion 273.

Figure 6B:
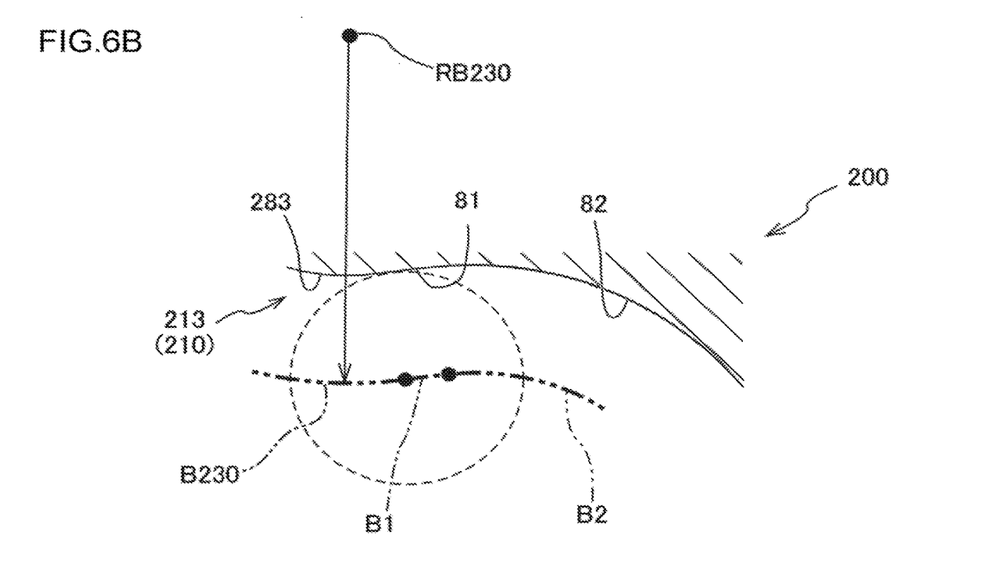
FIG. 6B is a view schematically illustrating a center locus of a ball rolling on a raceway surface of a second outer ball groove.

As illustrated in FIG. 6B, each second outer ball groove 213 has the second outer large-diameter portion 81, the second outer small-diameter portion 82, and an outer extension portion 283, and a raceway surface of the outer extension portion 283 on which the ball 30 rolls is in the shape of a curved surface that is convex inwardly in the radial direction of the outer joint member 210. The center locus B230 of the ball 30 rolling on the outer extension portion 283 has an arc shape having an arc center RB230 at a position radially outward (i.e., on the upper side in FIG. 6B) of the center of the ball 30 rolling on the outer extension portion 283.

The center of the ball 30 disposed at an end portion of the outer extension portion 283, the end portion being on the opening side is (i.e., the left side in FIG. 6B) of the outer joint member 210, is at a position farther away from the central axis L1 (refer to FIG. 2B) of the outer joint member 210 than the center of the ball 30 disposed at an end portion of the outer extension portion 283 is, the end portion being on the bottom side (i.e., the right side in FIG. 6B) of the outer joint member 210 (i.e., a junction between the outer extension portion 283 and the second outer large-diameter portion 81).

Therefore, it is possible to set the inner diameter of the opening-side end portion of the outer joint member 210 to a large value while smoothly rolling the ball 30 disposed between the inner extension portion 273 and the outer extension portion 283.

Next, a third embodiment will be described with reference to FIGS. 7A and 7B. In the first embodiment, the inner extension portion 73 has the inner uniform-diameter portion 74 and the inner diameter-increasing portion 75, and the outer extension portion 83 has the outer uniform-diameter portion 84 and the outer diameter-decreasing portion 85. In contrast, in the third embodiment an inner extension portion 373 has an inner diameter-decreasing portion 374, an inner curved portion 375, and an inner diameter-increasing portion 376, and an outer extension portion 383 has an outer diameter-decreasing portion 384, an outer curved portion 385, and an outer diameter-increasing portion 386. The same components as those in the embodiments described above will be denoted by the same reference numbers as those in the embodiments described above and will not be described again.

In a constant-velocity joint 300 according to the third embodiment, an outer joint member 310 has the same configuration as that of the outer joint member 10 in the first embodiment except second outer ball grooves 313, and an inner joint member 320 has the same configuration as that of the inner joint member 20 in the first embodiment except second inner ball grooves 323.

Figure 7A:
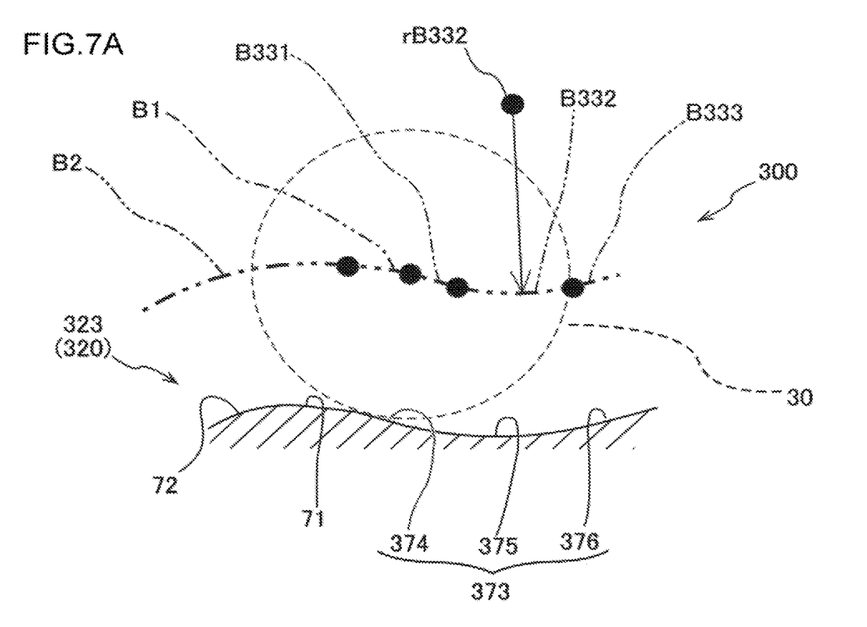
FIG. 7A is a view illustrating a third embodiment, FIG. 7A being a view schematically illustrating a center locus of a ball rolling on a raceway surface of a second inner ball groove.

As illustrated in FIG. 7A, each second inner ball groove 323 has the second inner large-diameter portion 71, the second inner small-diameter portion 72, and the inner extension portion 373, and the inner extension portion 373 has the inner diameter-decreasing portion 374, the inner curved portion 375, and the inner diameter-increasing portion 376.

The inner diameter-decreasing portion 374 is a portion extending from the second inner large-diameter portion 71 toward the bottom of the outer joint member 310 (i.e., toward the right side in FIG. 7A), and a raceway surface of the inner diameter-decreasing portion 374 on which the ball 30 rolls has such a taper shape that the diameter thereof decreases toward the bottom of the outer joint member 310. The inner curved portion 375 a portion extending from the inner diameter-decreasing portion 374 toward the bottom of the outer joint member 310, and a raceway surface of the inner curved portion 375 on which the ball 30 rolls is in the shape of a curved surface that is concave inwardly in the radial direction of the inner joint member 320. A center locus B332 of the ball 30 rolling on the inner curved portion 375 has an arc shape having an arc center rB332 at a position radially outward of the center of the ball 30 rolling on the inner curved portion 375.

The inner diameter-increasing portion 376 is a portion extending from the inner curved portion 375 toward the bottom of the outer joint member 310, and a raceway surface of the inner diameter-increasing portion 376 on which the ball 30 rolls has such a taper shape that the diameter thereof increases toward the bottom of the outer joint member 310. A center locus B333 of the ball 30 rolling on the inner diameter-increasing portion 376 has such a linear shape that the distance between the center locus B333 and the central axis L2 (refer to FIG. 3B) of the inner joint member 320 increases toward the bottom of the outer joint member 310 (i.e., toward the right side in FIG. 7A).

Figure 7B:
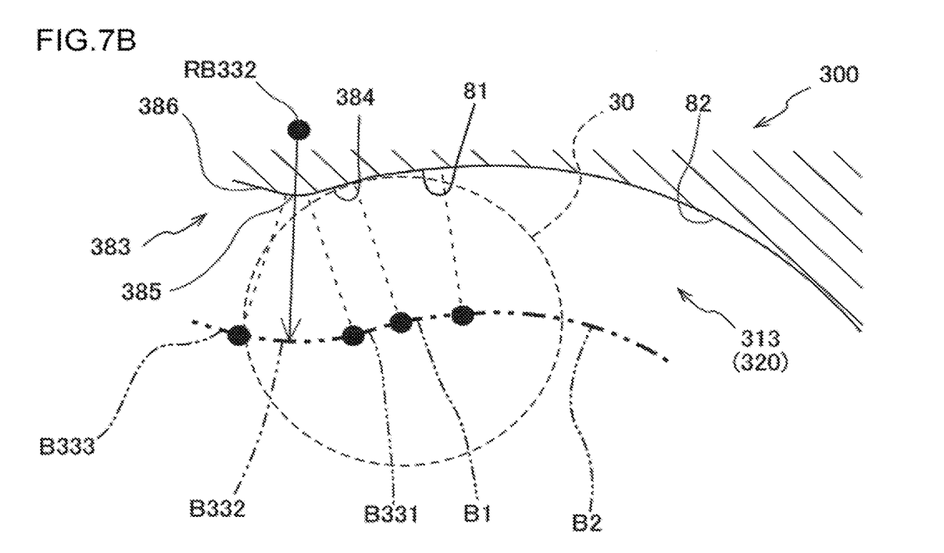
FIG. 7B is a view schematically illustrating a center locus of a ball rolling on a raceway surface of a second outer ball groove.

As illustrated in FIG. 7B, the second outer ball groove 313 has the second outer large-diameter portion 81, the second outer small-diameter portion and the outer extension portion 383, and the outer extension portion 383 has the outer diameter-decreasing portion 384, the outer curved portion 385, and the outer diameter-increasing portion 386.

The outer diameter-decreasing portion 384 is a portion that is provided continuously from the second outer large-diameter portion 81, and a raceway surface of the outer diameter-decreasing portion 384 on which the ball 30 rolls has such a taper shape that the diameter thereof decreases toward the opening of the outer joint member 310 (i.e., toward the left side in FIG. 7B). A center locus B331 of the ball 30 rolling on the outer diameter-decreasing portion 384 has such a linear shape that the distance between the center locus B331 and the central axis L1 of the outer joint member 310 decreases toward the opening of the outer joint member 310.

The outer curved portion 385 is a portion extending from the outer diameter-decreasing portion 384 toward the opening of the outer joint member 310, and a raceway surface of the outer curved portion 385 on which the ball 30 rolls is in the shape of a curved surface that is convex inwardly in the radial direction of the outer joint member 310. A center locus B332 of the ball 30 rolling on the outer curved portion 385 has an arc shape having an arc center RB332 at a position radially outward of the center of the ball 30 rolling on the outer curved portion 385.

The outer diameter-increasing portion 386 is a portion extending from the outer curved portion 385 toward the opening of the outer joint member 310, and a raceway surface of the outer diameter-increasing portion 386 on which the ball 30 rolls has such a taper shape that the diameter thereof increases toward the opening of the outer joint member 310. A center locus B333 of the ball 30 rolling on the outer diameter-increasing portion 386 has such a linear shape that the distance between center locus B333 and the central axis L1 (refer to FIG. 2B) of the outer joint member 310 increases toward the opening of the outer joint member 310.

The center of the ball 30 disposed at an end portion of the outer extension portion 383, the end portion being on the opening side of the outer joint member 310, (i.e., the end portion of the outer diameter-increasing portion 386) is at a position farther away from the central axis L1 of the outer joint member 310 than the center of the ball 30 disposed at an end portion of the outer extension portion 383 is (i.e., on the upper side in FIG. 7B), the end portion being on the bottom side (i.e., the right side in FIG. 7B) of the outer joint member 310 (i.e., a junction between the outer diameter-decreasing portion 384 and the second outer large-diameter portion 81). Therefore, it is possible to set the inner diameter of the opening-side end portion of the outer joint member 310 to a large value.

The distance from the center locus B333 of the ball 30 rolling on the outer diameter-increasing portion 386 to the central axis L1 of the outer joint member 310 increases toward the opening of the outer joint member 310. Therefore, it is possible to set the distance from the opening-side end portion of the enter joint member 310 to the central axis L1 of the outer joint member 310 to a large value.

In the present embodiment, the center locus B333 of the ball 30 rolling between the inner diameter-increasing portion 376 and the outer diameter-increasing portion 386 has a taper shape. However, the inner diameter-increasing portion 376 and the outer diameter-increasing portion 386 may be configured such that the center locus B333 of the ball 30 rolling between the inner diameter-increasing portion 376 and the outer diameter-increasing portion 386 has an arc shape having an arc center at a position outward of the center of the ball 30 rolling on the outer diameter-increasing portion 386, in the radial direction of the outer joint member 310. In this case, it is possible to set the distance from the opening-side end portion of the outer joint member 310 to the central axis L1 of the outer joint member 310 to a large value while suppressing an increase in the length of the outer joint member 310 in the axial direction.

While the invention has been described on the basis of the above-described embodiments, but the numerical values described in the embodiments described above are just examples, and it is needless to say that other numerical values are also applicable.

For example, in the embodiments described above, three first outer ball grooves 12 and three second outer ball grooves 13, 213, or 313 are provided in the inner peripheral surface 11 of the outer joint member 10, 210, or 310, and three first inner ball grooves and three second inner ball grooves 23, 223, or 323 are provided in the outer peripheral surface 21 of the inner joint member 20, 220 or 320. However, the number of the first outer ball grooves 12, the number of the second outer ball grooves 13, 213, or 313, the number of the first inner ball grooves 22, and the number of the second inner ball grooves 22, 223, or 323 may each be two or less or four or more.

In the first embodiment, the outer diameter-increasing portion 85 is configured such that the center locus B32 of the ball 30 rolling on the outer diameter-increasing portion has an arc shape having the arc center rB32 at a position outward of the center of the ball 30 rolling on the outer diameter-increasing portion 85, in the radial direction of the outer joint member 10. However, the configuration the outer diameter-increasing portion 85 is not limited thereto and the outer diameter-increasing portion 85 may be configured such that the center locus B32 of the ball 30 rolling on the outer diameter-increasing portion 85 has such a linear shape that the distance between the center locus B32 and the central axis L1 of the outer joint member 10 increases toward the opening of the outer joint member 10. In such a case, it is possible to simplify the shapes of the outer joint member 10 and the inner joint member 20.

In the first embodiment, the inner extension portion 73 has the inner uniform-diameter portion 74 and the inner diameter-increasing portion 75, and the outer extension portion 83 has the outer uniform-diameter portion 84 and the outer diameter-increasing portion 85. However, the inner diameter-increasing portion 75 and the outer diameter-increasing portion 85 may be omitted. In such a case, it is possible to simplify the shapes of the outer joint member 10 and the inner joint member 20.

In the first embodiment, the distance from the center of the ball 30 disposed at the end portion of the outer extension portion 83, the end portion being on the opening side of the outer joint member 10, to the central axis L1 of the outer joint member 10 is longer than the distance from the center of the ball 30 disposed at the end portion of the outer extension portion 83, the end portion being on the bottom side of the outer joint member 10, to the central axis L1 of the other joint member 10. However, the configuration is not limited thereto, as long as the distance from the center of the ball 30 disposed at the end portion of the order extension portion 83, the end portion being on the opening side of the outer joint member 10, to the central axis L1 of the outer joint member 10 is equal to or longer than the distance from the center of the ball 30 disposed at the end portion of the outer extension portion 83, the end portion being on the bottom side of the outer joint member 10, to the central axis L1 of the outer joint member 10.

As described above, the constant-velocity joint 100, 200, or 300 according to the invention includes: the outer joint member 10, 210, or 310 in the shape of a bottomed tube that is open on one side in the axial direction, and having the first outer ball grooves 12 and the second outer ball grooves 13, 213, or 313 that are provided in the inner peripheral surface 11; the inner joint member 20, 220, or 320 disposed inside the outer joint member 10, 210, or 310 and having the first inner ball grooves 22 and the second inner ball grooves 23, 223, or 323 that are provided in the outer peripheral surface 21; the balls 30 that are disposed between the first outer ball grooves 12 and the first inner ball grooves 22 and between the second outer ball grooves 13, 213, or 313 and the second inner ball grooves 23, 223, or 323; and the cage 40 disposed between the inner peripheral surface 11 of the outer joint member 10, 210, or 310 and the outer peripheral surface 21 of the inner joint member 20, 220, or 320 and having the cage pockets 41 configured to store the balls 30.

Each first inner ball groove 22 has the first inner large-diameter portion 51 configured such that the ball 30 rolls thereon, and each second inner ball groove 23 has the second inner large-diameter portion 71 configured such that the ball 30 rolls thereon and the inner extension portion 73, 273, or 373 extending from the second inner large-diameter portion 71 toward the bottom of the outer joint member 10, 210, or 310. Each first outer ball groove 12 has the first outer huge-diameter portion 61 configured such that the ball 30 is rollably supported between the first outer large-diameter portion 61 and the first inner ball groove 22, and each second outer ball groove 13 has the second outer large-diameter portion 81 configured such that the ball 30 is rollably supported between the second outer large-diameter portion 81 and the second inner ball groove 23, and the outer extension portion 83, 283, or 383 that is a portion extending from the second outer large-diameter portion 81 toward the opening of the outer joint member 10, configured to support the ball 30 such that the ball 30 is rollable between the inner extension portion 73 and the outer extension portion 83, 282, 383, and constituting a part of the opening-side end portion of the outer joint member 10, 210, or 310.

The center locus A1 of the ball rolling on the first outer large-diameter portion 61 has an arc shape having the arc center RA1 at a position that is on the opposite side of the central axis L1 of the outer joint member 10, 210, or 310 from the first outer large-diameter portion 61, and that is closer to the opening of the outer joint member 10, 210, or 310 than the joint center O is. The center locus B1 of the ball 30 rolling on the second outer large-diameter portion 81 has an arc shape having the arc center RB1 at a position that is on the opposite side of the central axis L1 of the outer joint member 10, 210 or 310 from the second outer large-diameter portion 81, and that is closer to the bottom of the outer joint member 10, 210, or 310 than the joint center O is.

Each of the center loci B31, B32, B230, or B331, B332, B333 of the ball 30 rolling on the outer extension portion 83, 283, or 383 is positioned, throughout its length, in a region including the tangent line T to the end portion of the center locus B1 of the ball 30 rolling on the second outer large-diameter portion 81, the end portion being on the opening side of the outer joint member 10, and the region being outward of the tangent line T in the radial direction of the outer joint member 10, 210, or 310. The opening-side end portion of the center locus B32, B230, or B333 of the ball 30 rolling on the outer extension portion 83, 283 or 383 is positioned outward of the tangent line T in the radial direction of the outer joint member 10, 210, or 310.

In the constant-velocity joint 100, 200, or 300 according to the invention, to the balls 30 disposed between the first outer ball grooves 12 and the first inner ball grooves 22 and the balls disposed between the second outer ball grooves 13, 213, or 313 and the second inner ball grooves 23, 223, or 323 receive, depending on changes in the joint angle that is an angle formed between the central axis L1 of the outer joint member 10, 210, or 310 and the central axis L2 of the inner joint member 20, 220, or 320, forces that attempt to move the balls toward the opening or toward the bottom of the center joint member 10, 210, or 310.

In view of this, in the constant-velocity joint 100, 200, or 300 according to the invention, the center locus A1 of the ball 30 rolling on the first outer large-diameter portion 61 has an arc shape having the arc center RA1 at a position closer to the opening of the outer joint member 10, 210, or 310 than the joint center O is, whereas the center locus B1 of the ball 30 rolling on the second outer large-diameter portion 81 has an arc shape having the arc center RB1 at a position closer to the bottom of the outer joint member 10, 210, or 310 than the joint center O is. Therefore, the balls 30 rolling on the first outer large-diameter portions 61 and the first inner large-diameter portions 51 receive forces that attempt to move the balls 30 in a direction toward the bottom of the outer joint member 10, 210, or 310 whereas the balls 30 rolling on the second outer large-diameter portions 81 and the second inner large-diameter portions 71 receive forces that attempt to move the balls 30 in a direction toward the opening of the outer joint member 10, 210, or 310, which is a direction opposite to the direction toward the bottom of the outer joint member 10, 210 or 310. Therefore, the forces applied to the balls 30 rolling on the first outer large-diameter portions 61 and the first tuner large-diameter portions 51 and the forces applied to the bills 30 rolling between the second outer large-diameter portions 81 and the second inner large-diameter portions 71 are cancelled out each other, and thus it is possible to suppress the displacement of the cage 40 due to the rolling of the balls 30.

As a result, the friction generated between the cage 40 and the inner peripheral surface 11 of the outer joint member 10, 210, or 310 and the friction generated between the cage 40 and the outer peripheral surface 21 of the inner joint member 20, 220, or 320 can be reduced, and thus it is possible to suppress a mechanical losses caused when torque is transmitted between the outer joint member 10, 210, or 310 and the inner joint member 20, 220, or 320.

The second outer large-diameter portion 81 is configured such that the center locus B1 of the ball 30 rolling on the second outer large-diameter portion 81 has an arc shape having the arc center RB1 at a position closer to the bottom of the outer joint member 10, 210, or 310 than the joint center O is. The outer extension portion 83, 283, or 383 is configured such that each of the center loci B31, B32, B230, or B331, B332, B333 of the ball 30 rolling on the outer extension portion 83, 283, or 383 is positioned, throughout its length, in a region including the tangent line T to the end portion of the center locus B1 of the ball 30 rolling on the second outer large-diameter portion 81, the end portion being on the opening side of the outer joint member 10, and the region being outward of the tangent line T in the radial direction of the outer joint member 10, 210, or 310. The outer extension portion 83, 283, or 383 is configured such that the opening-side end portion of the center locus B32, B230, or B333 of the ball 30 rolling on the outer extension portion 83, 283, or 383 is positioned outward of the tangent line T in the radial direction of the outer joint member 10, 210, or 310. In such a case, it is possible to increase the inner diameter at the opening-side end portion of the outer joint member, and thus it is possible to set the maximum value of the joint angle to a large value.

In the constant-velocity joint 100, 200, or 300, the distance front the center of the ball 30 disposed at the end portion of the outer extension portion 83, 283, or 383, the end portion being on the opening side of the outer joint member 10, 210, or 310 to the central axis L1 of the outer joint member 10, 210, or 310 is equal to or longer than the distance from the center of the ball 30 disposed at the end portion of the outer extension portion 83, 283, or 383, the end portion being on the bottom side of the outer joint member 10, 210, or 310, to the central axis L1 of the outer joint member 10, 210, or 310.

With the configuration of the constant-velocity joint 100, 200, or 300, in the course of manufacturing the constant-velocity joint 100, 200, or 300, it is possible to more easily prevent the cage 40 from coming into contact with the opening-side end portion of the outer joint member 10, 210, or 310 when the cage 40 is assembled to the inside of the outer joint member 10, 210, or 310. As a result, it is possible to efficiently perform a work of assembling the constant-velocity joint 100, 200 or 300.

In the constant-velocity joint 100, the inner extension portion 73 has the inner uniform-diameter portion extending from the second inner large-diameter portion 71 toward the bottom of the outer joint member 10, the outer extension portion 83 has the outer uniform-diameter portion 84 extending from the second outer large-diameter portion 81 toward the opening of the outer joint member 10, and the center locus B31 of the ball 30 rolling on the outer uniform-diameter portion 84 has such a linear shape that the distance from the central axis L1 of the outer joint member 10 to the center locus B31 is constant.

With the constant-velocity joint 100, in the portion in which the outer uniform-diameter portion 84 is provided, it is possible to set the distance from the raceway surface of the outer uniform-diameter portion 84 on which the ball 30 rolls to the central axis L1 of the outer joint member 10 to a large value. As a result, the minimum inner diameter of the outer joint member 10 can be set to a large value, and it is thus possible to set the maximum value of the joint angle to a large value.

In the constant-velocity joint 100, the inner extension portion 73 has the inner diameter-increasing portion 75 extending from the inner uniform-diameter portion 74 toward the bottom of the outer joint member 10, the outer extension portion 83 has the outer diameter-increasing portion 85 extending from the outer uniform-diameter portion 84 toward the opening of the outer joint member 10, and the distance between the center locus B32 of the ball 30 rolling on the outer diameter-increasing portion 85 and the central axis L1 of the outer joint member increases toward the opening of the outer joint member 10.

With the constant-velocity joint 100, it is possible to set the distance from center of the ball 30 disposed at the end portion of the outer diameter-increasing portion the end portion being on the opening side of the outer joint member 10, to the central axis L1 of the outer joint member 10 to a large value. As a result, the inner diameter of the outer diameter-increasing portion 85 at the end portion on the opening side of the outer joint member 10 can be set to a large value. Thus, in the course of manufacturing the constant-velocity joint 100, it is possible to more easily prevent the cage 40 from coming into contact with the opening-side end portion of the outer joint member 10 when the cage 40 is assembled to the inside of the outer joint member 10.

In the constant-velocity joint 200, the center locus B230 of the ball 30 rolling on the outer extension portion 283 has an arc shape having the arc center RB230 at a position outward of the center of the ball 30 rolling on the outer extension portion 283, in the radial direction of the outer joint member 210.

With the constant-velocity joint 200, it is possible to set the inner diameter of the opening-side end portion of the outer joint member 210 to a large value, while smoothly rolling the ball 30 disposed between the inner extension portion 273 and the outer extension portion 283.

In the constant-velocity joint 300, the inner extension portion 373 has the inner diameter-decreasing portion 374 extending from the second inner large-diameter portion 71 toward the bottom of the outer joint member 310, the inner curved portion 375 extending from the inner diameter-decreasing portion 374 toward the bottom of the outer joint member 310, and the inner diameter-increasing portion 376 extending from the inner curved portion 375 toward the bottom of the outer joint member 310. The outer extension portion 383 has the outer diameter-decreasing portion 384 extending from the second outer large-diameter portion 81 toward the opening of the outer joint member 310, the outer curved portion 385 extending from the outer diameter-decreasing portion 384 toward the opening of the outer joint member 310, and the outer diameter-increasing portion 386 extending from the outer curved portion 385 toward the opening of the outer joint member 310.

The center locus B331 of the ball 30 rolling on the outer diameter-decreasing portion 384 has such a linear shape that the distance from the central axis L1 of the outer joint member 310 to the center locus B331 decreases toward the opening of the outer joint member 310, the center locus B332 of the ball 30 rolling on the outer curved portion 385 has an arc shape having the arc center RB332 at a position outward of the center of the ball 30 rolling on the outer curved portion 385, in the radial direction of the outer joint member 310, and the distance between the center locus B333 of the ball 30 rolling on the outer diameter-increasing portion 386 and the central axis L1 of the outer joint member 310 increases toward the opening of the outer joint member 310.

With the constant-velocity joint 300, it is possible to set the inner diameter of the opening-side end portion of the outer joint member 310 to a large value, while smoothly rolling the ball 30 disposed between the inner extension portion 373 and the outer extension portion 383.

In the constant-velocity joint 100 or 300, the center locus B32 or B333 of the ball 30 rolling on the outer diameter-increasing portion 85 or 386 has an arc shape having the arc center RB32 at a position outward of the center of the ball 30 rolling on the outer diameter-increasing portion 85 or 386, in the radial direction of the outer joint member 10 or 310.

With the constant-velocity joint 100 or 300, it is possible to set the distance from the end portion of the outer diameter-increasing portion 85 or 386 on the opening side of the outer joint member 10 or 310 to the central axis L1 of the outer joint member 10 or 310 to a large value, while suppressing an increase in the length of the outer joint member 10 or 310 in the axial direction.

What is claimed is:

1. A constant-velocity joint comprising:
   an outer joint member in a shape of a bottomed tube that is open on one side in an axial direction, the outer joint member having first outer ball grooves and second outer ball grooves provided in an inner peripheral surface of the outer joint member;
   an inner joint member disposed inside the outer joint member, the inner joint member having first inner ball grooves and second inner ball grooves provided in an outer peripheral surface of the inner joint member;
   balls disposed between the first outer ball grooves and the first inner ball grooves and between the second outer ball grooves and the second inner ball grooves; and
   a cage disposed between the outer joint member and the inner joint member, the cage having cage pockets configured to store the balls, wherein
   each of the first inner ball grooves has a first inner large-diameter portion configured such that the corresponding one of the balls rolls on the first inner large-diameter portion,
   each of the second inner ball grooves has a second inner large-diameter portion and as inner extension portion, the second inner large-diameter portion being configured such that the corresponding one of the balls rolls on the second inner large-diameter portion, and the inner extension portion extending from the second inner large-diameter portion toward a bottom of the outer joint member,
   each of the first outer ball grooves has a first outer large-diameter portion configured such that the corresponding one of the balls is rollably supported between the first outer large-diameter portion and the corresponding one of the first inner ball grooves,
   each of the second outer ball grooves has a second outer large-diameter portion and an outer extension portion, the second outer large-diameter portion being configured such that the corresponding one of the balls is rollably supported between the second outer large-diameter portion and the corresponding one of the second inner ball grooves, the outer extension portion extending from the second outer large-diameter portion toward an opening of the outer joint member, the outer extension portion being configured such that the corresponding one of the balls is supported so as to be rollable between the outer extension portion and the inner extension portion, and the outer extension portion constituting a part of an opening-side end portion of the outer joint member,
   a center locus of the corresponding one of the balls rolling on the first outer large-diameter portion has an arc shape having an arc center at a position that is on an opposite side of a central axis of the outer joint member from the first outer large-diameter portion, and that is closer to the opening of the outer joint member than a joint center is,
   a center locus of the corresponding one of the balls rolling on the second outer large-diameter portion has an arc shape having an arc center at a position that is on an opposite side of the central axis of the outer joint member from the second outer large-diameter portion, and that is closer to the bottom of the outer joint member than the joint center is,
   a center locus of the corresponding one of the balls rolling on the outer extension portion is positioned, throughout a length of the center locus, in a region including a tangent line to an opening-side end portion of the center locus of the corresponding one of the balls rolling on the second outer large-diameter portion, the opening-side end portion being on an opening side of the outer joint member, and the region being positioned outward of the tangent line in a radial direction of the outer joint member, and
   an opening-side end portion of the center locus of the corresponding one of the balls rolling on the outer extension portion, the opening-side end portion of the center locus being on the opening side of the outer joint member, is positioned outward of the tangent line in the radial direction of the outer joint member.

2. The constant-velocity joint according to claim 1, wherein a distance from a center of the corresponding one of the balls disposed at an opening-side end portion of the outer extension portion, the opening-side end portion being on the opening side of the outer joint member, to the central axis of the outer joint member is equal to or longer than a distance from the center of the corresponding one of the balls disposed at a bottom-side end portion of the outer extension portion, the bottom-side end portion being on a bottom side of the outer joint member, to the central axis of the outer joint member.

3. The constant-velocity joint according to claim 2, wherein
   the inner extension portion has an inner uniform-diameter portion extending from the second inner large-diameter portion toward the bottom of the outer joint member,
   the outer extension portion has an outer uniform-diameter portion extending from the second outer large-diameter portion toward the opening of the outer joint member, and
   a center locus of the corresponding one of the balls rolling on the inner uniform-diameter portion and the outer uniform-diameter portion is linear and a distance from the central axis of the outer joint member to the center locus is constant.

4. The constant-velocity joint according to claim 3, wherein
the inner extension portion has an inner diameter-increasing portion extending from the inner uniform-diameter portion toward the bottom of the outer joint member,
the outer extension portion has an outer diameter-increasing portion extending from the outer uniform-diameter portion toward the opening of the outer joint member, and
a distance between a center locus of the corresponding one of the balls rolling on the outer diameter-increasing portion and the central axis of the outer joint member increases toward the opening of the outer joint member.

5. The constant-velocity joint according to claim 4, wherein the center locus of the corresponding one of the balls rolling on the outer diameter-increasing portion has an arc shape having an arc center at a position outward of the center of the corresponding one of the balls rolling on the outer diameter-increasing portion, in the radial direction of the outer joint member.

6. The constant-velocity joint according to claim 1, wherein the center locus of the corresponding one of the balls rolling on she outer extension portion has an arc shape having an arc center at a position outward of a center of the corresponding one of the balls rolling on the outer extension portion, in the radial direction of the outer joint member.

7. The constant-velocity joint according to claim 1, wherein
the inner extension portion has
an inner diameter-decreasing portion extending from the second inner large-diameter portion toward the bottom of the outer joint member,
an inner curved portion extending from the inner diameter-decreasing portion toward the bottom of the outer joint member, and
an inner diameter-increasing portion extending from the inner curved portion toward the bottom of the outer joint member,
the order extension portion has
an outer diameter-decreasing portion extending from the second outer large-diameter portion toward the opening of the outer joint member,
an outer curved portion extending from the outer diameter-decreasing portion toward the opening of the outer joint member, and
an outer diameter-increasing portion extending from the outer curved portion toward the opening of the outer joins member,
a center locus of the corresponding one of the balls rolling on the outer diameter-decreasing portion is linear and a distance from the central axis of the outer joint member to the center locus decreases toward the opening of the outer joint member,
a center locus of the corresponding one of the balls rolling on the outer curved portion has an arc shape having an arc center at a position outward of a center of the corresponding one of the balls rolling on the outer curved portion, in the radial direction of the outer joint member, and
a distance between a center locus of the corresponding one of the balls rolling on the outer diameter-increasing portion and the central axis of the outer joint member increases toward the opening of the outer joint member.

* * * * *